O. H. FARVER.
VEHICLE FRAME.
APPLICATION FILED APR. 4, 1911.
1,027,193.
Patented May 21, 1912.
2 SHEETS—SHEET 1.
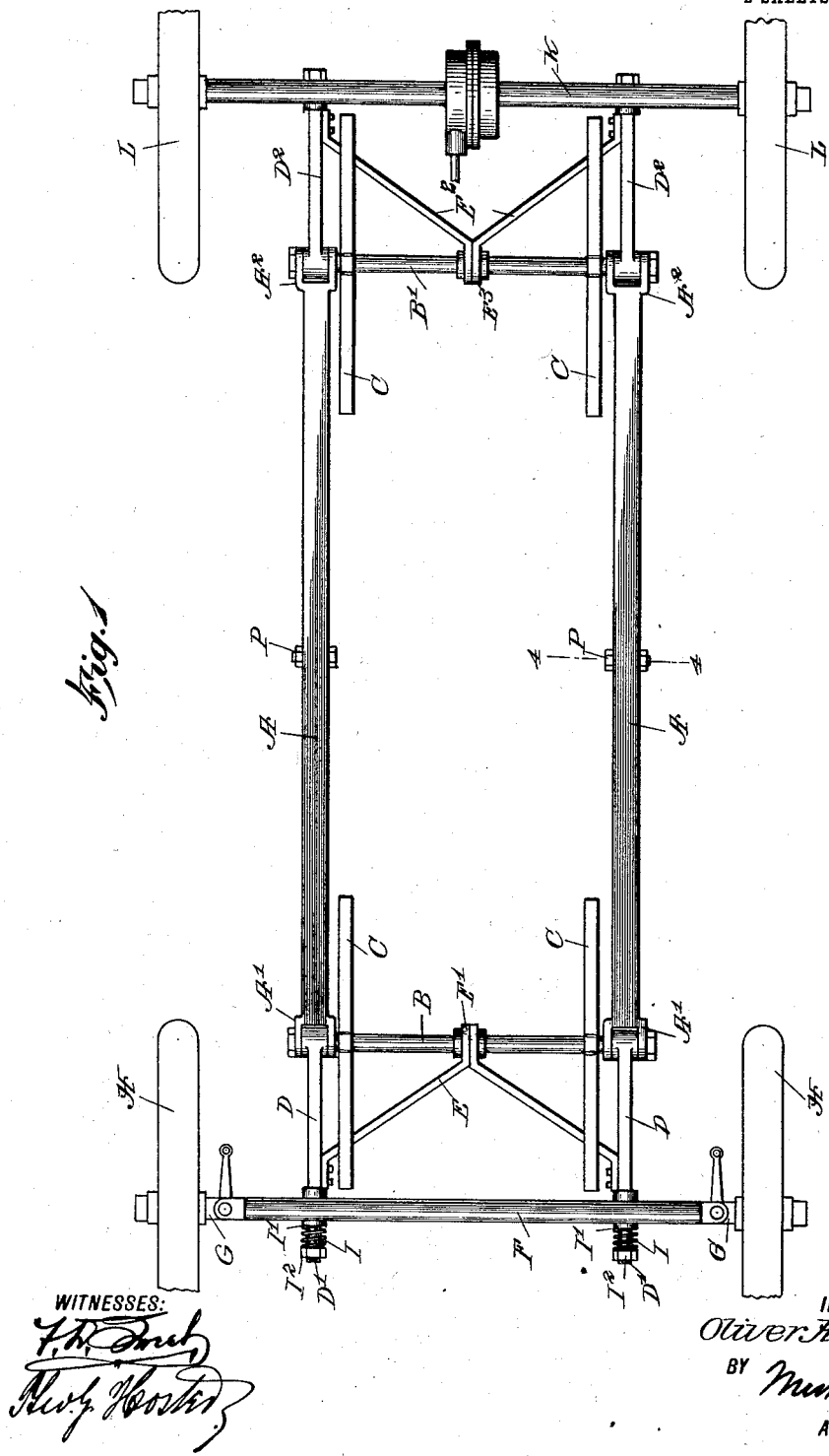
WITNESSES:
INVENTOR
Oliver H. Farver
BY Munn & Co.
ATTORNEYS O. H. FARVER.
VEHICLE FRAME.
APPLICATION FILED APR. 4, 1911.
1,027,193.
Patented May 21, 1912.
2 SHEETS—SHEET 2.
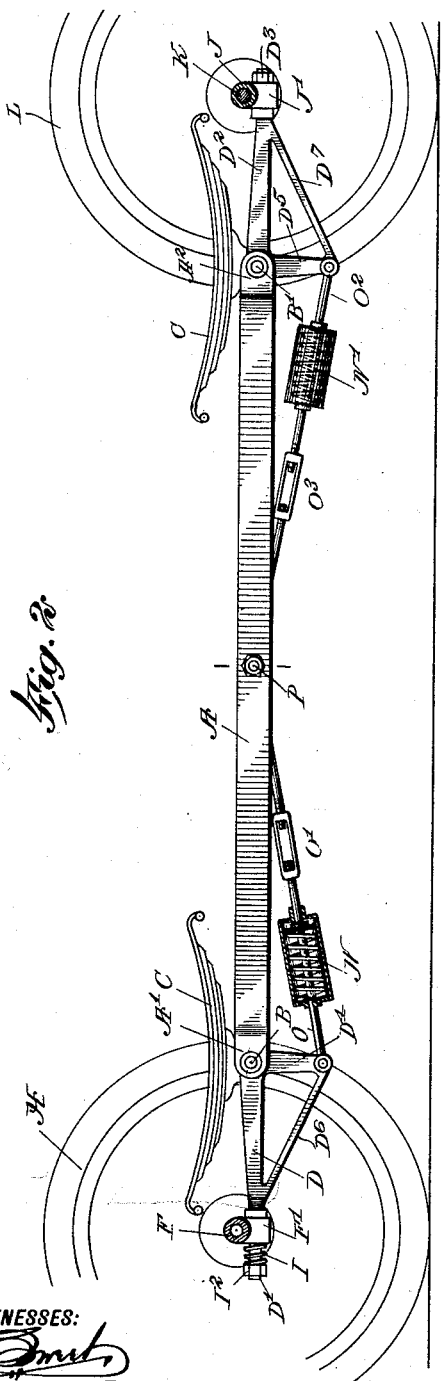
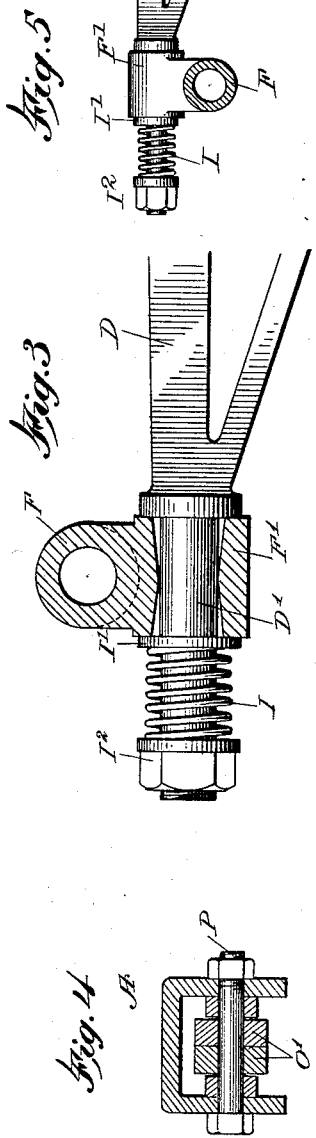
INVENTOR
Oliver H. Farver
BY
ATTORNEYS
WITNESSES:

UNITED STATES PATENT OFFICE.

OLIVER HAZARD FARVER, OF ORRVILLE, OHIO.

VEHICLE-FRAME.

1,027,193.   Specification of Letters Patent.   Patented May 21, 1912.

Application filed April 4, 1911. Serial No. 618,781.

*To all whom it may concern:*

Be it known that I, OLIVER H. FARVER, a citizen of the United States, and a resident of Orrville, in the county of Wayne and State of Ohio, have invented a new and Improved Vehicle-Frame, of which the following is a full, clear, and exact description.

The invention relates to the mounting of vehicle bodies on the frame or chassis of a motor vehicle or other vehicle, and its object is to provide a vehicle frame or truck, improved with respect to simplicity, strength and general elasticity and arranged to permit the use of ordinary solid tire wheels, at the same time providing for the desired easy riding in the vehicle body when traveling over rough roads.

A further and more particular object of this invention is to provide a frame and connections pivotally mounted on the ends of the frame and connecting the same with the wheel axles in a novel manner, said connections having parts which rock in rigid bearings on the axles and at least those connections at one end of the frame, having a sliding spring controlled connection with the respective wheel axle, whereby to increase the elastic qualities of the connections, without complicating the frame as a whole.

A further object is to so brace the connections with respect to the frame, that the above construction may be employed without sacrificing any of the normal strength of this character of the device.

A practical embodiment of the invention is represented in the accompanying drawings forming a part of this specification, in which similar characters of reference indicate corresponding parts in all the views.

Figure 1 is a plan view of the vehicle frame; Fig. 2 is a side elevation of the same; Fig. 3 is an enlarged sectional side elevation of the pivotal connection between an arm and its bearing on the axle; Fig. 4 is an enlarged cross section of one of the side beams, the section being on the line 4—4 of Fig. 1. Fig. 5 is a sectional side elevation of a modified form of the bearing on the axle.

Side beams A, preferably of channel iron, are provided at their forward and rear ends with eyes $A'$, $A^2$ engaged by transverse shafts or pins B, $B'$, supporting leaf springs C for connection with the vehicle body, to support the same. The forward shaft B is pivotally connected with forwardly-extending arms D, connected with each other by a brace E having an eye $E'$ pivotally engaging the shaft B at the middle thereof. The arms D terminate in longitudinally extending pins $D'$ engaging bearings $F'$ formed or arranged on the forward axle F, provided at its ends with stub axles G carrying the front wheels H, suitable provision being made for connecting the stub axles G with the steering gear for steering the vehicle in the desired direction. Each of the pins $D'$ extends forwardly beyond the bearing $F'$, and on the projecting end is coiled a spring I resting with one end on a washer $I'$ abutting against the front of the bearing $F'$ while the other end of the said spring I abuts against a nut $I^2$ screwing on the outer end of the pin $D'$. The bearing $F'$ has its bore in the form of two frustums of cones, united at their apex ends, as plainly indicated in Fig. 3, so as to permit the pin $D'$ to rock up and down in the bearing $F'$.

The rear shaft $B'$ is pivotally connected with rearwardly-extending arms $D^2$, connected with each other by a brace $E^2$ similar to the brace E, having an eye $E^3$ engaging the shaft $B'$ at or near the middle thereof. The arms $D^2$ terminate in pins $D^3$ engaging bearings $J'$ similar to the bearings $F'$ and depending from a sleeve K through which extends the rear axle carrying the rear wheels L, it being understood that the rear axle is driven in the usual manner by a suitable motor for propelling the vehicle forward. The arms D and $D^2$ are provided with depending members $D^4$ and $D^5$ connected by braces $D^6$, $D^7$ with the outer ends of the said arms, as plainly indicated in Fig. 2, and the said depending members $D^4$ and $D^5$ are pressed on by compression springs N and $N'$, of which the compression spring N is connected at one end by a rod O with the free end of the arm $D^4$, while the other end of the spring N is connected by a sectional rod $O'$ having a turnbuckle with a pin P held on the corresponding beam A, at or near the middle thereof. The rear compression springs $N'$ are connected by rods $O^2$ with the arms $D^5$, and by sectional rods $O^3$ having turnbuckles with the pins P. By the arrangement described a yielding connection is had between the beams A and the front and rear axles, so that when the wheels H and L travel over uneven ground then the strain incident thereto is taken up by the compression springs N and $N'$, thus relieving the vehicle body of undue shocks and jars, especially when the vehicle is traveling over uneven or rough ground. Any severe strain is taken up by the compression springs above mentioned or with the assistance of the springs I controlling the sliding connections of the levers D with the front axle L. By this arrangement, also rigid bearings may be employed on the axles, and provision is made for an extra lengthy wheel base and the use of any suitable or desired vehicle body springs.

From the foregoing it will be seen that by the arrangement described, the vehicle wheels H and L may be of the solid tire type, and hence the heavy tire expense for automobiles and similar motor vehicles is reduced to a minimum, and at the same time an easy riding in the vehicle body is insured. The bearings F and J' may depend from the front and rear axles or may be above the same, as will be readily understood by comparison of Figs. 3 and 5.

Having thus described my invention, I claim as new and desire to secure by Letters Patent:

1. A vehicle frame, comprising side beams, transverse shafts on the ends of the said side beams, arms pivotally connected with the said shafts and having pivotal and sliding connections with the axles, the arms having depending members, springs connecting the said depending arm members with the said beams between the ends thereof, and vehicle body springs on the said shafts for supporting the vehicle body.

2. A vehicle frame, comprising side beams terminating at their ends in eyes, transverse shafts journaled in the said eyes, arms pivotally connected at their inner ends with the said shafts, the arms having depending members and terminating in pivot pins, sleeves on the axles and having bearings in which said pins are mounted so as to move longitudinally, compression springs and rods connecting the said compression springs with the said depending arm members and the said side beams and means to control the movement of said pivot pins.

3. A vehicle frame, comprising side beams terminating at their ends in eyes, transverse shafts journaled in the said eyes, arms pivotally connected at their inner ends with the said shafts, the arms having depending members and terminating in pivot pins, sleeves on the axles and having bearings in which the said pins are longitudinally movable, the latter extending lengthwise of the frame and projecting beyond the said bearings, springs on the projecting ends of the said pivot pins, compression springs, and adjustable rods connecting the said depending arm members with the said side beams between the ends thereof.

4. The combination with wheeled axles, of bearing members on said axles said members having their bores in the form of two frustums of cones, side beams, arms pivotally connected to the end portions of said beams and having depending portions and end pins projected through said bearing members, springs compressed between the outer portions of said bearings and portions of said pins at their outer ends, connections between said depending arm portions and said beams, and springs interposed in said connections.

5. The combination with wheeled axles, of bearing members on said axles, side beams, transverse shafts journaled between the ends of said beams and forming a frame therewith, arms pivotally connected at their inner ends to said shafts adjacent the beams and having sliding connections at their opposite ends with said bearing members, means to control the sliding movement of said arms with respect to said bearing members, connections between portions of said arms and the beams, springs interposed in said connections, and a brace at each end of the frame pivotally mounted upon the respective transverse shaft and having divergent portions secured to said connecting members.

In testimony whereof I have signed my name to this specification in the presence of two subscribing witnesses.

OLIVER HAZARD FARVER.

Witnesses:
A. J. HELLER,
P. M. KIDD.

---

Copies of this trade-mark may be obtained for five cents each, by addressing the "Commissioner of Patents, Washington, D. C."